(12) United States Patent
Kawamura

(10) Patent No.: US 11,128,749 B2
(45) Date of Patent: Sep. 21, 2021

(54) COMMUNICATION TERMINAL DEVICE, PROGRAM, AND INFORMATION-PROCESSING METHOD

(71) Applicant: NTT DOCOMO, INC., Tokyo (JP)

(72) Inventor: Satoru Kawamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 238 days.

(21) Appl. No.: 16/328,048

(22) PCT Filed: Oct. 18, 2017

(86) PCT No.: PCT/JP2017/037702
§ 371 (c)(1),
(2) Date: Feb. 25, 2019

(87) PCT Pub. No.: WO2018/079379
PCT Pub. Date: May 3, 2018

(65) Prior Publication Data
US 2021/0075902 A1 Mar. 11, 2021

(30) Foreign Application Priority Data

Oct. 27, 2016 (JP) .............................. JP2016-210944

(51) Int. Cl.
*H04M 1/72* (2021.01)
*H04M 1/72454* (2021.01)
*G06F 3/16* (2006.01)
*G10L 15/08* (2006.01)
*G10L 15/22* (2006.01)

(52) U.S. Cl.
CPC ........ *H04M 1/72454* (2021.01); *G06F 3/167* (2013.01); *G10L 15/08* (2013.01); *G10L 15/22* (2013.01); *G10L 2015/088* (2013.01); *G10L 2015/223* (2013.01); *H04M 2250/12* (2013.01); *H04M 2250/74* (2013.01)

(58) Field of Classification Search
CPC ..... H04M 1/72569; G10L 15/08; G10L 15/22
USPC ......................................................... 455/418
See application file for complete search history.

(56) References Cited

FOREIGN PATENT DOCUMENTS

| CN | 105072280 A | 11/2015 |
|---|---|---|
| JP | 2002-325279 A | 11/2002 |
| JP | 5481058 B | 4/2014 |
| TW | 201408036 A | 2/2014 |

OTHER PUBLICATIONS

International Search Report issued in corresponding PCT Application No. PCT/JP2017/037702 dated Dec. 22, 2017, 4 pages.
Extended European Search Report issued in corresponding European Application No. 17865957.9 dated Jun. 4, 2019, 8 pages.

*Primary Examiner* — Joel Ajayi
(74) *Attorney, Agent, or Firm* — MKG, LLC

(57) ABSTRACT

A communication terminal device records voice data indicating a voice input during a call in memory (S2), and upon detecting that a proximity of a user's head to the communication terminal device has ceased to be detected (S3 and S4; YES), recognizes an utterance after a time point a predetermined period of time prior to a time point at which a proximity of the head to the communication terminal device has ceased to be detected, based on voice data recorded in the memory (S5). Upon detecting that a predetermined keyword has been recognized, and that no proximity of the head to the communication terminal device is detected, the communication terminal device terminates the call (S9).

13 Claims, 9 Drawing Sheets

COMMUNICATION TERMINAL DEVICE, PROGRAM, AND INFORMATION-PROCESSING METHOD

TECHNICAL FIELD

The present invention relates to terminating a call in a communication terminal device.

BACKGROUND ART

There is described in JP 2002-325279 A1 a technique for terminating a call without the necessity of an operation by a user, whereby a mobile terminal terminates a call on recognizing a keyword uttered such as "goodbye" or "bye." There is described in JP 5481058 B a technique for controlling a terminal by use of voice commands during a call, and activating a speech recognition function for recognizing a voice command, only during a necessary time period.

The mobile terminal described in JP 2002-325279 A1 activates a speech recognition function at the start of a call, and continues to perform speech recognition during the call, as a result of which the mobile terminal consumes much electrical power. According to the technique described in JP 5481058 B, a user needs to activate a speech recognition function by use of a button or a touch-screen to enable a voice command to be recognized. Thus, enabling a voice command is somewhat inconvenient to the user.

In view of the problems described above, it is an object of the present invention to enable a call to be terminated in response to a user's natural action taken to terminate the call, while curbing electricity consumed for speech recognition.

To solve the problems described above, the present invention provides a communication terminal device for performing communication for a call, comprising: a proximity detecting unit configured to detect that a head of a user has approached the communication terminal device; a voice input accepting unit configured to accept an input of a voice of the user; a recording unit configured to record voice data indicating a voice of the user input during a call, in memory; a speech recognition unit configured to recognize an utterance by the user after a predetermined time point during the call, based on voice data stored in the memory, upon detecting that a proximity of the head to the communication terminal device has ceased to be detected; and a call termination control unit configured to terminate the call upon detecting that a predetermined keyword has been recognized, and that no proximity of the head to the communication terminal device is detected.

In the communication terminal device, the predetermined time point may be a time point a predetermined period of time prior to a time point at which a proximity of the head to the communication terminal device has ceased to be detected.

The communication terminal device may further comprise a measurement unit configured to measure an attitude of the communication terminal device, and the call terminal control unit may be configured to terminate the call upon detecting that an attitude of the communication terminal device has changed after no proximity of the head to the communication terminal device is detected.

The communication terminal device may further comprise an extraction unit configured to extract a word uttered by the user when terminating the call, and the call termination control unit may be configured to use a word extracted when terminating one or more calls, as the keyword.

The present invention provides a program for causing a computer of a communication terminal device for performing communication to facilitate a call, to: detect that a head of a user has approached the communication terminal device; accept an input of a voice of the user; record voice data indicating a voice of the user input during a call, in memory; recognize an utterance by the user after a predetermined time point during the call, based on voice data stored in the memory, upon detecting that a proximity of the head to the communication terminal device has ceased to be detected; and terminate the call upon detecting that a predetermined keyword has been recognized, and that no proximity of the head to the communication terminal device is detected.

The present invention provides an information-processing method comprising: detecting that a head of a user has approached the communication terminal device; accepting an input of a voice of the user; recording voice data indicating a voice of the user input during a call, in memory; recognizing an utterance by the user after a predetermined time point during the call, based on voice data stored in the memory, upon detecting that a proximity of the head to the communication terminal device has ceased to be detected; and terminating the call upon detecting that a predetermined keyword has been recognized, and that no proximity of the head to the communication terminal device is detected.

The present invention makes it possible to terminate a call in response to a natural action taken by a user to end the call, while curbing consumption of electrical power by a speech recognition function.

SUMMARY

Embodiments of the present invention will be described below with reference to drawings.

First Embodiment

Figure 1:
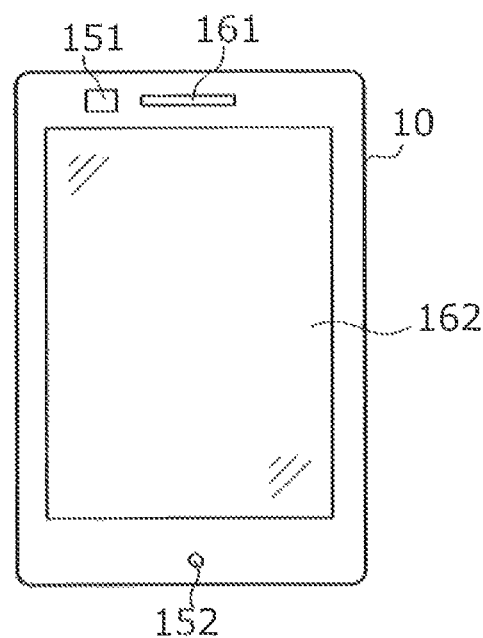
FIG. 1 is a front view of a communication terminal device according to a first embodiment of the present invention.

FIG. 1 is a front view of communication terminal device 10 according to a first embodiment of the present invention. Communication terminal device 10 is a portable communication terminal device held by a user in his/her hand. Communication terminal device 10 is a smartphone in the present embodiment.

Communication terminal device 10 performs communication to facilitate a call. To enable a user to make a call, communication terminal device 10 includes a microphone 152 and a speaker 161 on the front of the device. Microphone 152 is a voice input device for inputting a user's voice. Microphone 152 is arranged such that it may be positioned near the mouth of a user making a call. Speaker 161 is a voice output device for outputting voice. Speaker 161 is arranged such that it may be positioned near the head (specifically, an ear) of a user making a call.

Communication terminal device 10 also includes display area 162 and proximity sensor 151 on the front of the device. Display area 162 is a display area of a display in which an image (screen) is displayed. Proximity sensor 151 is provided adjacent to speaker 161, and is a sensor for detecting proximity of an object. The term "proximity" as used herein refers to both a contact state and a non-contact state. Proximity sensor 151 is, for example, an infrared light sensor, a high frequency oscillation sensor using electromagnetic induction, or a magnetic sensor using a magnet. Any type of detecting method may be used.

Figure 2:
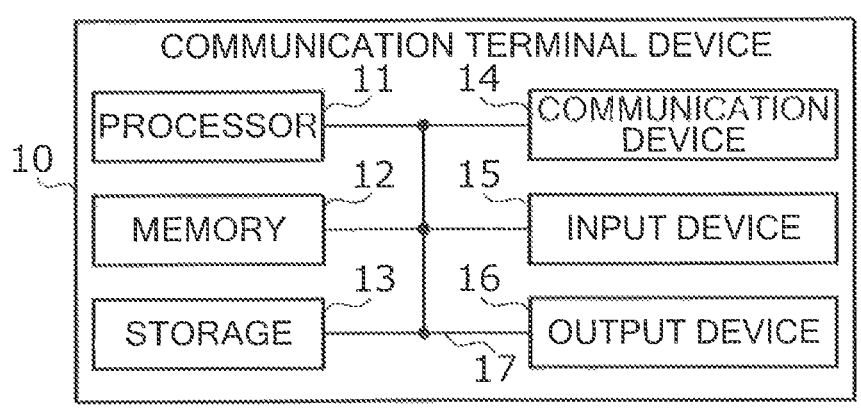
FIG. 2 is a diagram showing an example of a hardware configuration of the communication terminal device according to the first embodiment.

FIG. 2 is a diagram showing an example of a hardware configuration of communication terminal device 10. Communication terminal device 10 is physically configured as a computer device including processor 11, memory 12, storage 13, communication device 14, input device 15, output device 16, and bus 17.

In the following description, the term "device" may refer to a circuit or unit. Communication terminal device 10 may include one or more devices shown in the drawing, or some of the devices shown in the drawing may not be included.

Processor 11 controls a computer, for example, by running an operating system. Processor 11 may include a central processing unit (CPU) that includes interfaces to peripheral devices, a control device, an arithmetic device, and a register.

Processor 11 reads a program (program code), a software module, and data from storage 13 and/or communication device 14 to memory 12 so that it performs various processes based on the read data. As the program, a program for causing a computer to perform at least part of the operations of the present embodiment is used. The various processes may be performed by a single processor 11, or may be performed by two or more processors 11 simultaneously or sequentially. Processor 11 may include one or more chips. The program may be received via electronic communication media.

Memory 12 is a computer-readable recording medium, and, for example, includes at least one of a read only memory (ROM), an erasable programmable ROM (EEPROM), and a random access memory (RAM). Memory 12 may be referred to as a register, a cache, or a main memory.

Storage 13 is a computer-readable recording medium, and, for example, includes at least one of an optical disk such as a compact disc ROM (CD-ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, and a magnetic strip. Storage 13 may be referred to as an auxiliary storage device.

Communication device 14 is hardware (a transmitting and receiving device) for enabling communication between computers via a wireless network. Communication device 14 may be referred to as a network device, a network controller, a network card, or a communication module. Communication device 14 performs communication to facilitate a call.

Input device 15 is a device for accepting input from an external source, such as a keyboard, a mouse, microphone 152, a switch, buttons, and sensors including proximity sensor 151. Output device 16 is a device for performing output to an external device, such as a display, speaker 161, and an LED lamp.

The devices such as processor 11 and memory 12 are connected by bus 17 for data communication. Bus 17 may include a single bus, or may include plural buses for connecting devices.

Communication terminal device 10 may include hardware such as a microprocessor, a digital signal processor (DSP), an application specific integrated circuit (ASIC), a programmable logic device (PLD), and a field programmable gate array (FPGA). The hardware may function as part or all of functional blocks. For example, processor 11 may include at least one of the items of hardware.

Functions of communication terminal device 10 are provided by causing hardware such as processor 11 and memory 12 to read software (a program(s)) so that processor 11 is able to control communication performed by communication device 14 and reading and/or writing performed in memory 12 and storage 13.

Figure 3:
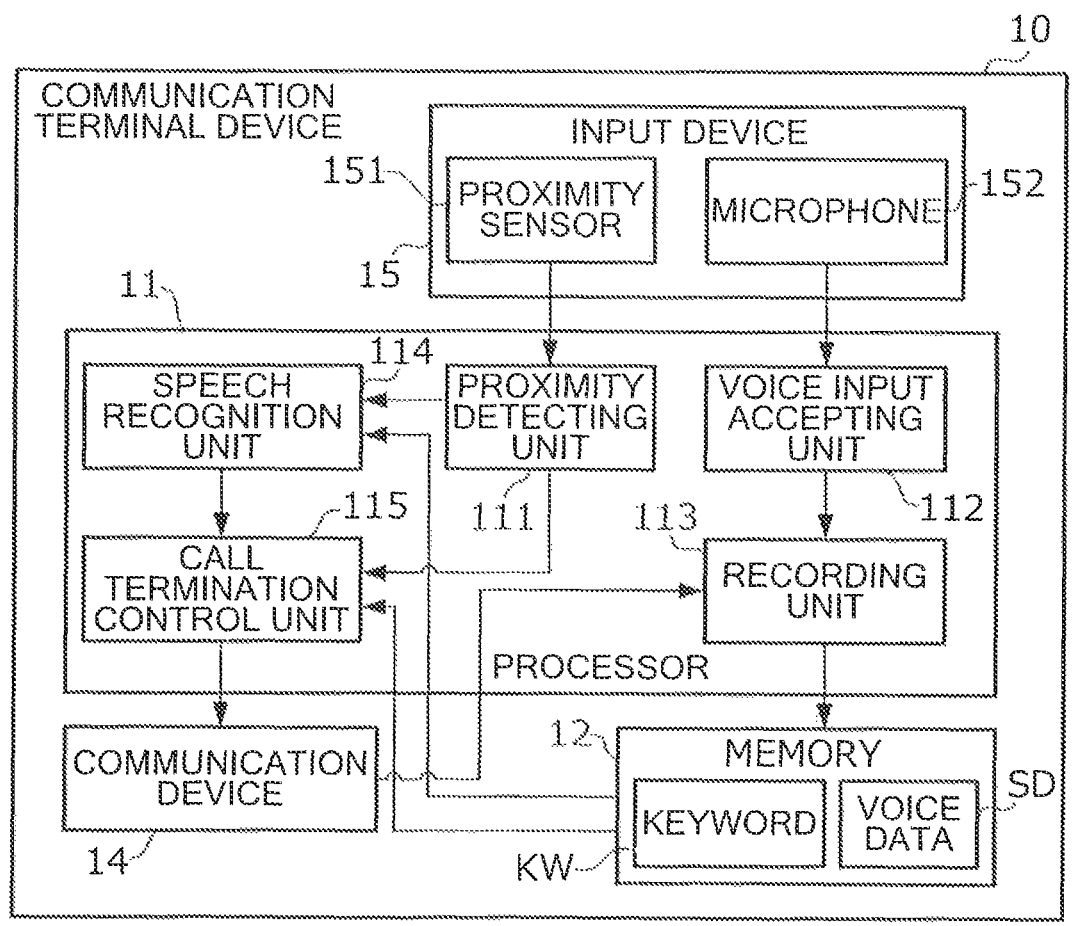
FIG. 3 is a diagram showing an example of a functional configuration of a processor of the communication terminal device according to the first embodiment.

FIG. 3 is a block diagram showing an example of a functional configuration of processor 11 of communication terminal device 10. Processor 11 includes proximity detecting unit 111, voice input accepting unit 112, recording unit 113, speech recognition unit 114, and call termination control unit 115.

Proximity detecting unit 111 detects that a user's head has approached communication terminal device 10, based on a value output by proximity sensor 151. When a proximity of an object is detected by proximity detecting unit 111 during a call, the object is regarded as a user's head. The term "during a call" refers to a time period during which an established communication path is available for a call. Proximity detection unit 111 notifies speech recognition unit 114 and call termination control unit 115 of whether a user's head is close to communication terminal device 10.

Voice input accepting unit 112 accepts a user's voice input via microphone 152. Voice input accepting unit 112 converts an analog voice signal supplied from microphone 152 into digital voice data, which is, for example, waveform data indicating a speech waveform. Voice input accepting unit 112 supplies the voice data to recording unit 113.

Recording unit 113 records voice data indicating a user's voice input during a call, in memory 12. In other words, recording unit 113 records a user's voice. Voice data stored in memory 12 will be referred to as "voice data SD."

When a proximity of a user's head to communication terminal device 10 ceases to be detected during a call, speech recognition unit 114 recognizes a user's speech input after a predetermined time point during the call, based on voice data SD stored in memory 12. The term "predetermined time point" refers to a time point a predetermined period of time prior to a time point when a proximity of a user's head has ceased to be detected. As a result of speech recognition, a user's voice is converted into a character string (text code).

Call termination control unit 115 performs call termination control, which is a function to terminate a call, or more specifically, a function to disconnect a communication path used for a call. Call termination control unit 115 performs call termination control when speech recognition unit 114 has recognized keyword KW stored in memory 12 during a time period in which a proximity of a user's head to communication terminal device 10 is not detected. Keyword KW is, for example, a predetermined character string. Keyword KW may be decided at the design stage of communication terminal device 10 or may be designated by a user. Keyword KW is a word(s) uttered when terminating a call, such as "bye-bye" or "see you."

Figure 4:
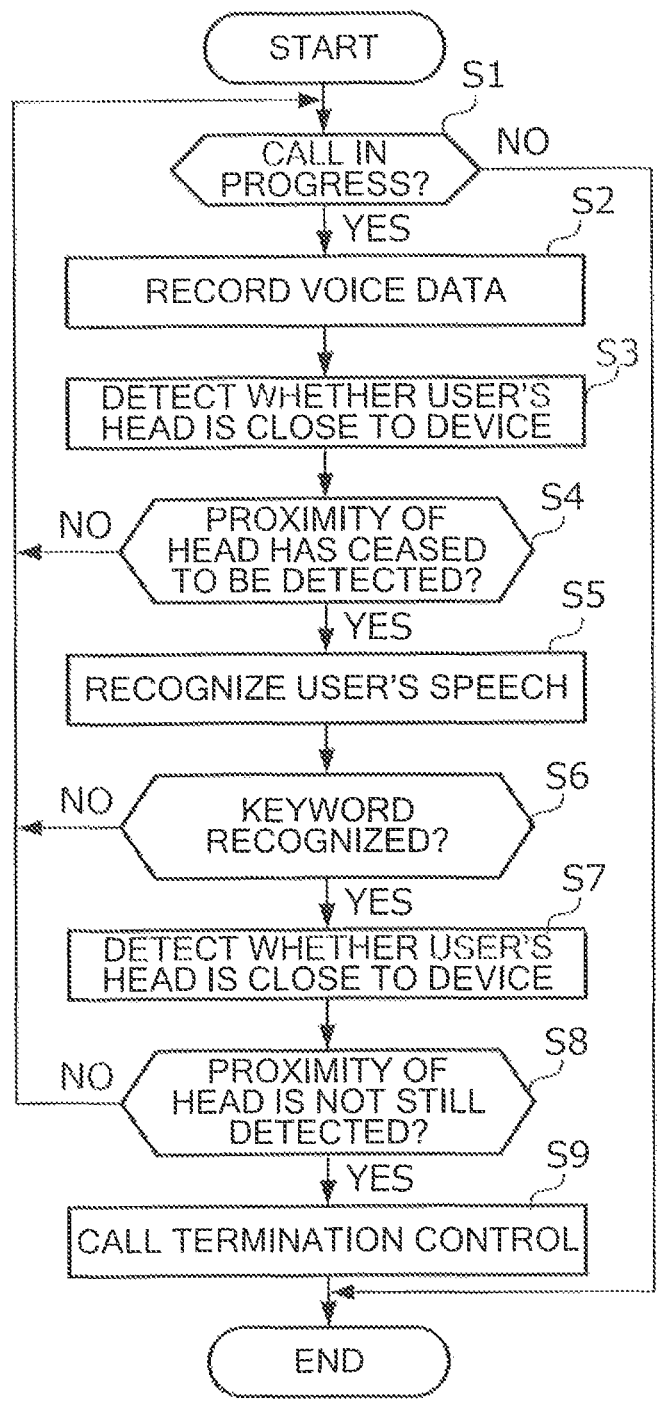
FIG. 4 is a flowchart showing a process executed during a call by the communication terminal device according to the first embodiment.
Figure 5:
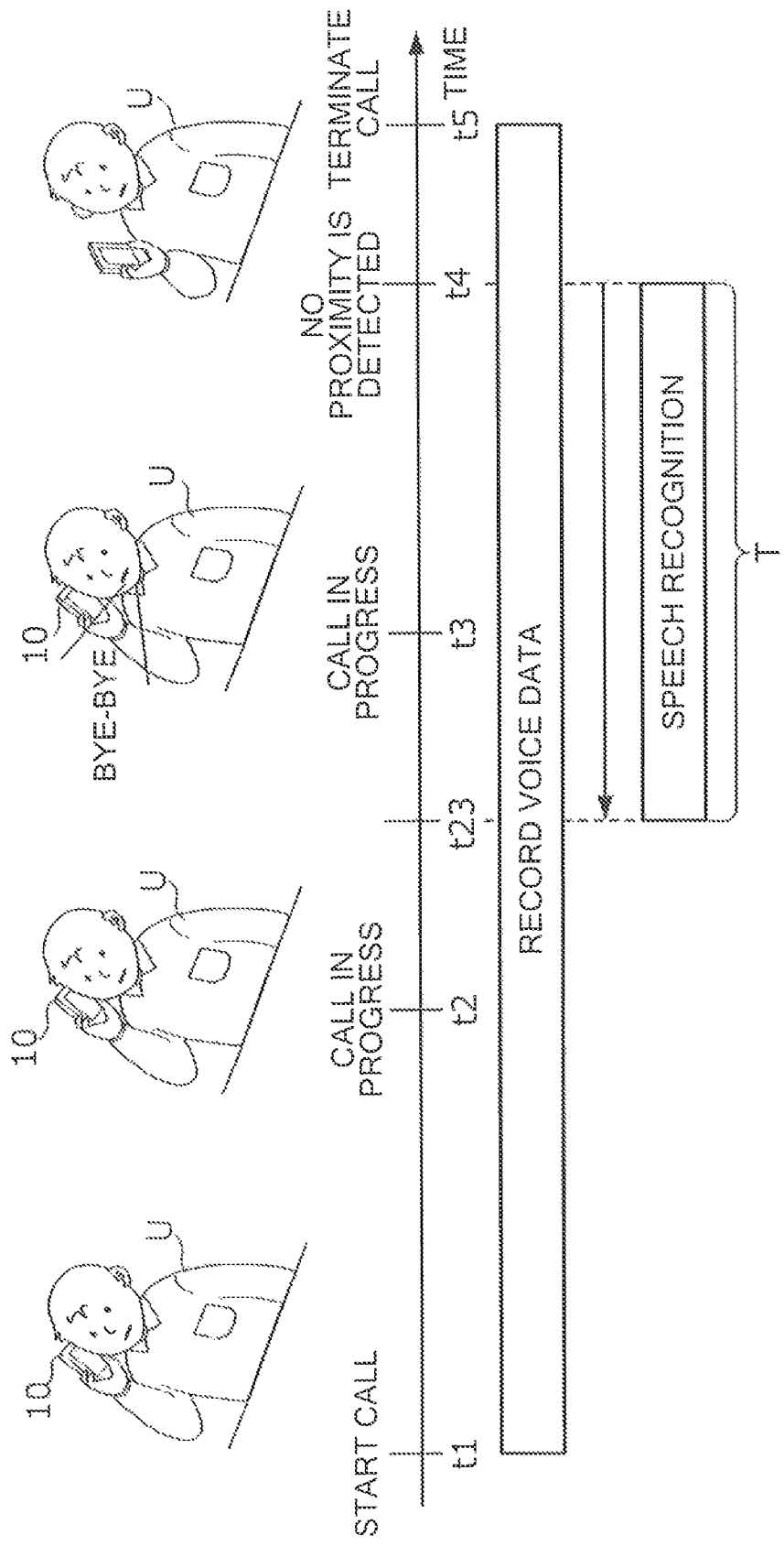
FIG. 5 is a diagram showing a concrete example of the process executed during a call by the communication terminal device according to the first embodiment.
Figure 6:
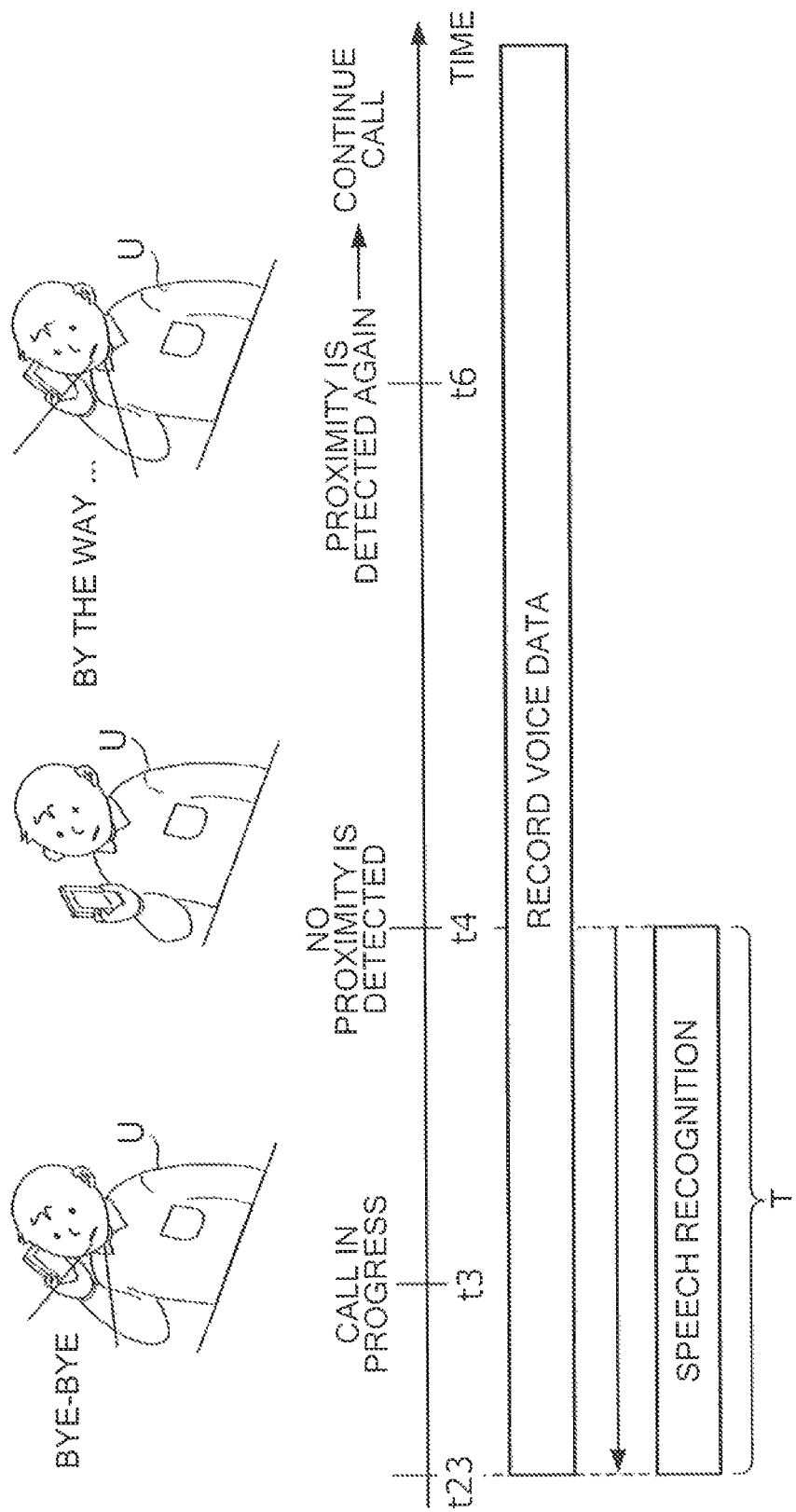
FIG. 6 is a diagram showing a concrete example of the process executed during a call by the communication terminal device according to the first embodiment.

FIG. 4 is a flowchart showing a process executed during a call by communication terminal device 10. FIGS. 5 and 6 are diagrams showing concrete examples of the process executed during a call by communication terminal device 10.

Recording unit 113 determines whether a call is in progress in communication terminal device 10 (step S1). When a communication path established by communication device 14 is available for a call, recording unit 113 determines "YES" at step S1. Subsequently, recording unit 113 records voice data generated by voice input accepting unit 112 based on an input from microphone 152, in memory 12 (step S2). In a case where user U starts a call using communication terminal device 10 at time t1, as shown in FIG. 5, recording unit 113 starts recording voice data from the time the call starts.

Subsequently, proximity detecting unit 111 detects whether a user's head is close to communication terminal device 10, based on a value output by proximity sensor 151 (step S3). In FIG. 5, communication terminal device 10 has been held to the right ear of user U since time t1 at which the call was started. In that situation, proximity detecting unit 111 detects that the head of user U is close to communication terminal device 10.

Subsequently, proximity detecting unit 111 determines whether the proximity of the user's head has ceased to be detected (step S4). At step S4, it is determined whether communication terminal device 10, which was close to the user's head, has moved away from the head. When "NO" is determined at step S4, communication terminal device 10 returns to step S1 while maintaining the call, because it is considered that communication terminal device 10 is close to the user's head, and the user is still talking.

Recording unit 113 continues step S2 of recording voice data during the call (for example, at time t2 shown in FIG. 5). However, it is not necessary to keep all items of voice data recorded during the call, in memory 12. It is only necessary to keep in memory 12 at least voice data indicating a voice input after a time point a predetermined period of time prior to a present time point. In other words, voice data generated before the prior time point may be deleted. The "predetermined period of time" ranges from 3 to 10 seconds, for example.

Subsequently, at time t3, user U utters a word "bye-bye." Such an utterance is included in actions performed naturally when terminating a call. Voice data indicating the utterance is recorded in memory 12. Subsequently, at time t4, user U moves communication terminal device 10 away from the ear. This action is also included in actions performed naturally when terminating a call. Subsequent to the action, proximity detecting unit 111 detects no proximity of the user's head to communication terminal device 10, whereby proximity detecting unit 111 determines that the proximity of the user's head has ceased to be detected (step S4; YES).

Subsequently, speech recognition unit 114 recognizes a user's speech based on voice data SD stored in memory 12 (step S5). At step S5, a user's speech is recognized, which had been input after a time point a predetermined period of time prior to a time point at which the proximity of the user's head has ceased to be detected. In the example of FIG. 5, a user's speech is recognized, which had been input during time period T starting from time t23 preceding time t4 by a predetermined time and ending at time t4. Speech recognition unit 114 recognizes a user's speech when the proximity of the user's head to communication terminal device 10 has ceased to be detected.

In the example of FIG. 5, voice data recorded before time t23 may be deleted. By deleting voice data unnecessary for speech recognition, storage areas of memory 12 are freed.

Subsequently, call termination control unit 115 determines whether speech recognition unit 114 has recognized keyword KW (step S6). Specifically, call termination control unit 115 determines whether user U has uttered keyword KW during time period T starting from time t23 and ending at time t4.

When "NO" is determined at step S6, communication terminal device 10 returns to step S1 while maintaining the call.

In a case where, as shown in FIG. 5, user U has uttered a word "bye-bye" at time t3, call termination control unit 115 determines "YES" at step S6. In that case, proximity detecting unit 111 detects whether the user's head is close to communication terminal device 10, based on a value output by proximity sensor 151 (step S7). Subsequently, proximity detecting unit 111 detects whether the user's head remains close to communication terminal device 10 (step S8). Steps S7 and S8 are performed to determine whether communication terminal device 10 remains away from the user's head after the user utters a keyword KW to terminate the call.

When "YES" is determined at step S8, call termination control unit 115 performs call termination control (step S9). In the example of FIG. 5, no proximity of the user's head has been detected from time t4 to time t5, whereby call termination control unit 115 performs call termination control. After the call termination control is performed, recording unit 113 stops recording voice data.

On the other hand, when "NO" is determined at step S8, namely, when a proximity of the user's head has been detected again, communication terminal device 10 returns to step S1 while maintaining the call. In a case where, as shown in FIG. 6, user U has uttered keyword KW "bye-bye" at time t3, and moved communication terminal device 10 from the ear, the user may recall something to talk and resume the conversation. In the example shown in FIG. 6, user U puts communication terminal device 10 to the ear again at time t6. So as not to perform call termination control in such a case, communication terminal device 10 maintains the call when "NO" is determined at step S8.

In communication terminal device 10 described in the foregoing, speech recognition is not performed continuously during a call. Instead, voice data on a user's voice input during a call is recorded in memory 12, and speech is recognized based on voice data SD stored in memory 12 when a proximity of a user's head has ceased to be detected. Accordingly, a smaller amount of electrical power is consumed in communication terminal device 10 than in a case where speech recognition is performed continuously during a call. Communication terminal device 10 also performs call termination control only when recognizing keyword KW uttered by a user, and detecting no proximity of a user's head. Accordingly, a possibility of terminating a call contrary to a user's intention is low.

Second Embodiment

Now, a second embodiment of the present invention will be described.

Communication terminal device 10A according to the present embodiment determines whether to perform call termination control, based on a change in attitude of the device measured when a user is about to terminate a call. In the present embodiment, components shared with the first embodiment are denoted by like reference numerals.

Figure 7:
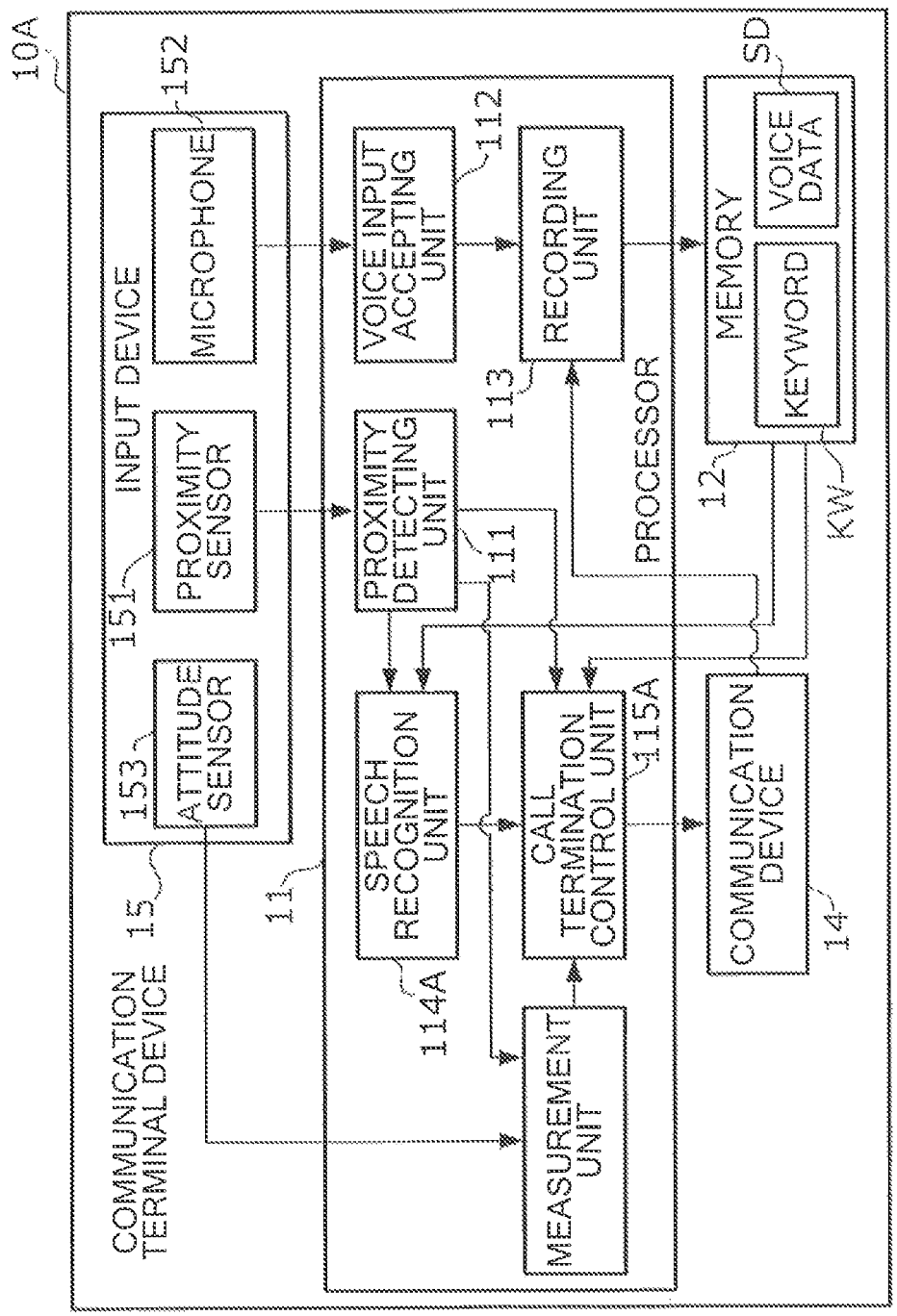
FIG. 7 is a diagram showing an example of a functional configuration of a processor of a communication terminal device according to a second embodiment of the present invention.

FIG. 7 is a block diagram showing an example of a functional configuration of processor 11 of communication terminal device 10A. Processor 11 includes proximity detecting unit 111, voice input accepting unit 112, recording unit 113, speech recognition unit 114A, call termination control unit 115A, and measurement unit 116. Input device 15 includes attitude sensor 153 that is a sensor for measuring an attitude of communication terminal device 10A. Attitude sensor 153 is, for example, a triaxial acceleration sensor, an angular velocity sensor, or any other sensor capable of measuring a physical quantity that changes according to a change in attitude (for example, rotation) of communication terminal device 10A.

Measurement unit 116 measures an attitude of communication terminal device 10A based on a value measured by attitude sensor 153. In the present embodiment, proximity detecting unit 111 notifies speech recognition unit 114A, call termination control unit 115A, and measurement unit 116 of whether a user's head is close to communication terminal device 10A. In response to the notification, measurement unit 116 determines whether an attitude of communication terminal device 10 has changed.

Call termination control unit 115A performs call termination control when the same condition as that of the first embodiment has been met, and an attitude of communication terminal device 10A has changed after no proximity of a user's head is detected by proximity detecting unit 111.

Figure 8:
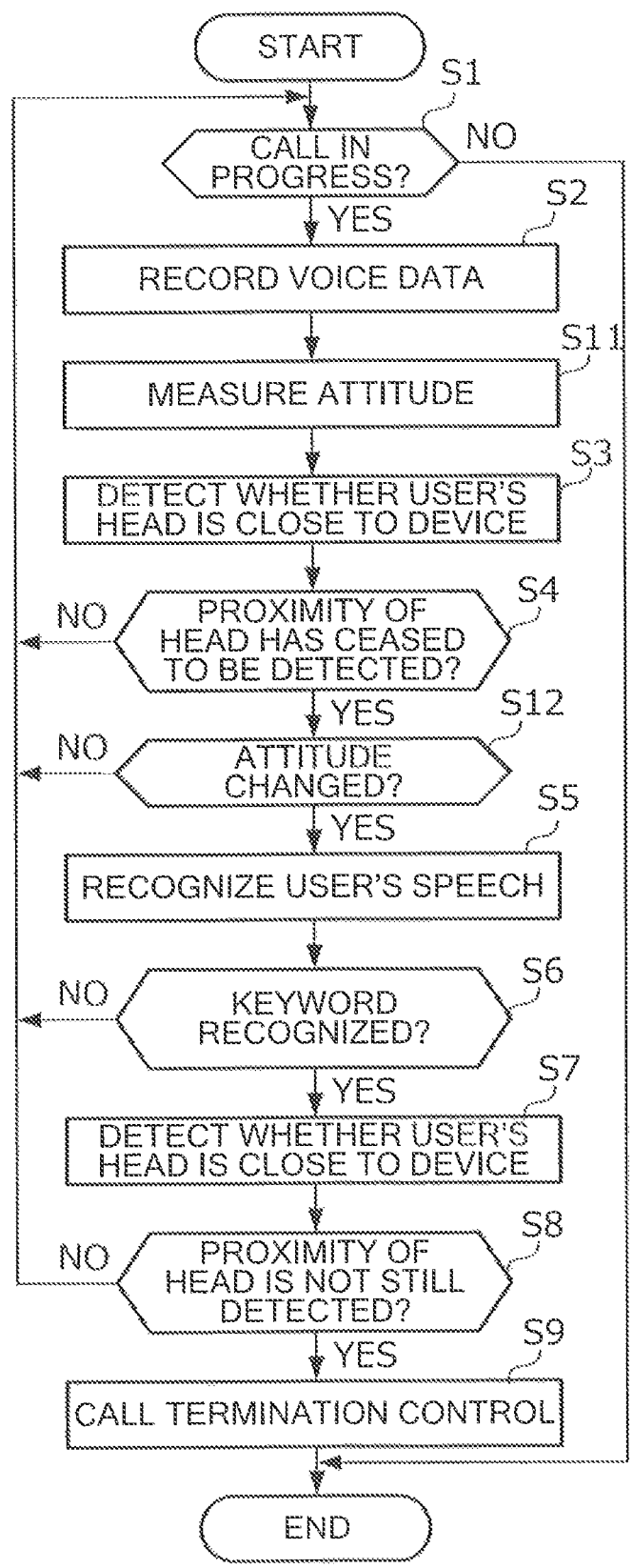
FIG. 8 is a flowchart showing a process executed during a call by the communication terminal device according to the second embodiment.
Figure 9:
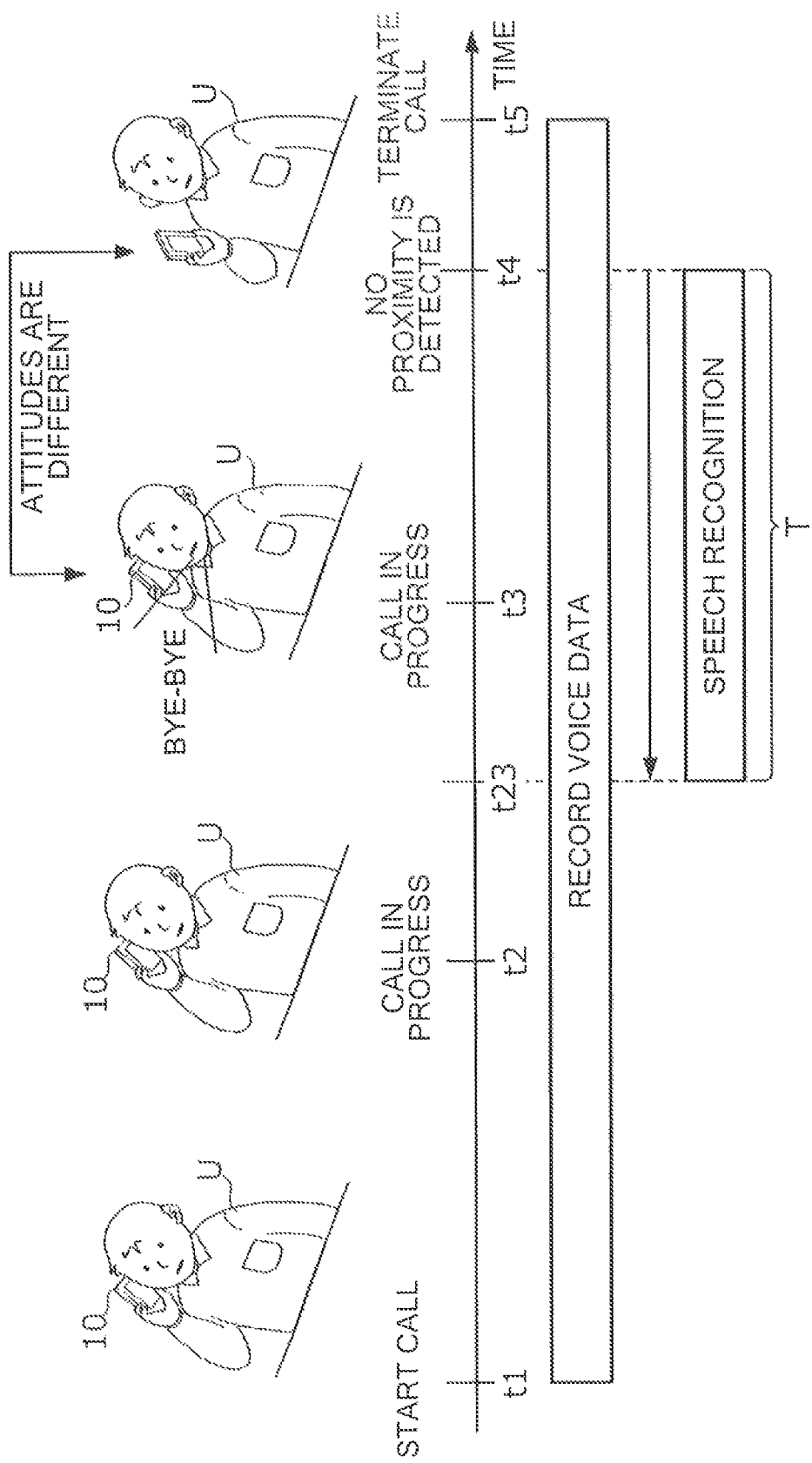
FIG. 9 is a diagram showing a concrete example of the process executed during a call by the communication terminal device according to the second embodiment.

FIG. 8 is a flowchart showing a process executed during a call by communication terminal device 10A. FIG. 9 is a diagram showing a concrete example of the process executed during a call by communication terminal device 10A.

During a call, in communication terminal device 10A, recording unit 113 records voice data generated by voice input accepting unit 112 based on an input from microphone 152, in memory 12 (steps S1 and S2). Subsequently, measurement unit 116 measures an attitude of communication terminal device 10A based on a value measured by attitude sensor 153 (step S11). Subsequently, proximity detecting unit 111 detects whether a user's head is close to communication terminal device 10A, based on a value output by proximity sensor 151 (step S3). Subsequently, proximity detecting unit 111 determines whether the proximity of the user's head has ceased to be detected (step S4).

When "NO" is determined at step S4, communication terminal device 10A returns to step S1 while maintaining the call, as in the case of the first embodiment.

On the other hand, when "YES" is determined at step S4, a step different from that of the first embodiment is performed. Specifically, when proximity detecting unit 111 has determined that the proximity of the user's head has ceased to be detected, measurement unit 116 determines whether an attitude of communication terminal device 10A has changed (step S12). When "NO" is determined at step S12, communication terminal device 10A returns to step S1 while maintaining the call.

When "YES" is determined at step S12, speech recognition unit 114A recognizes a user's speech based on voice data SD stored in memory 12 (step S5). Subsequently, when call termination control unit 115 has determined that speech recognition unit 114 had recognized keyword KW (step S6; YES), and that proximity detecting unit 111 continued to detect no proximity of the user's head (step S7 and step S8; YES), call termination control unit 115 performs call termination control (step S9).

When the user moves communication terminal device 10A away from the head, an attitude of the device changes. As can be understood by comparing attitudes of communication terminal device 10A at times t3 and t4 shown in FIG. 9, an attitude measured when the user utters keyword KW and an attitude measured after the user has moved communication terminal device 10A away from the ear are different. According to communication terminal device 10A in which call termination control is triggered by a change in attitude, a possibility of terminating a call at a wrong timing is lowered. Also, recognition of a user's speech is not started when no change in attitude of communication terminal device 10A is detected after a proximity of a user's head ceases to be detected. Since unnecessary recognition of a user's speech is avoided, electrical power is saved.

MODIFICATIONS

The present invention may be implemented in an embodiment different from the above embodiments. Two or more of the following modifications may be combined.

Modification 1

A communication terminal device according to the present invention may include a function of learning keywords. Communication terminal device 10B according to the present modification registers a word uttered by a user when terminating a call, in memory 12 as a keyword. In the present embodiment, "keyword KW" described in the first embodiment will be referred to as "keyword KW1," and a keyword registered by learning will be referred to as "keyword KW2."

Figure 10:
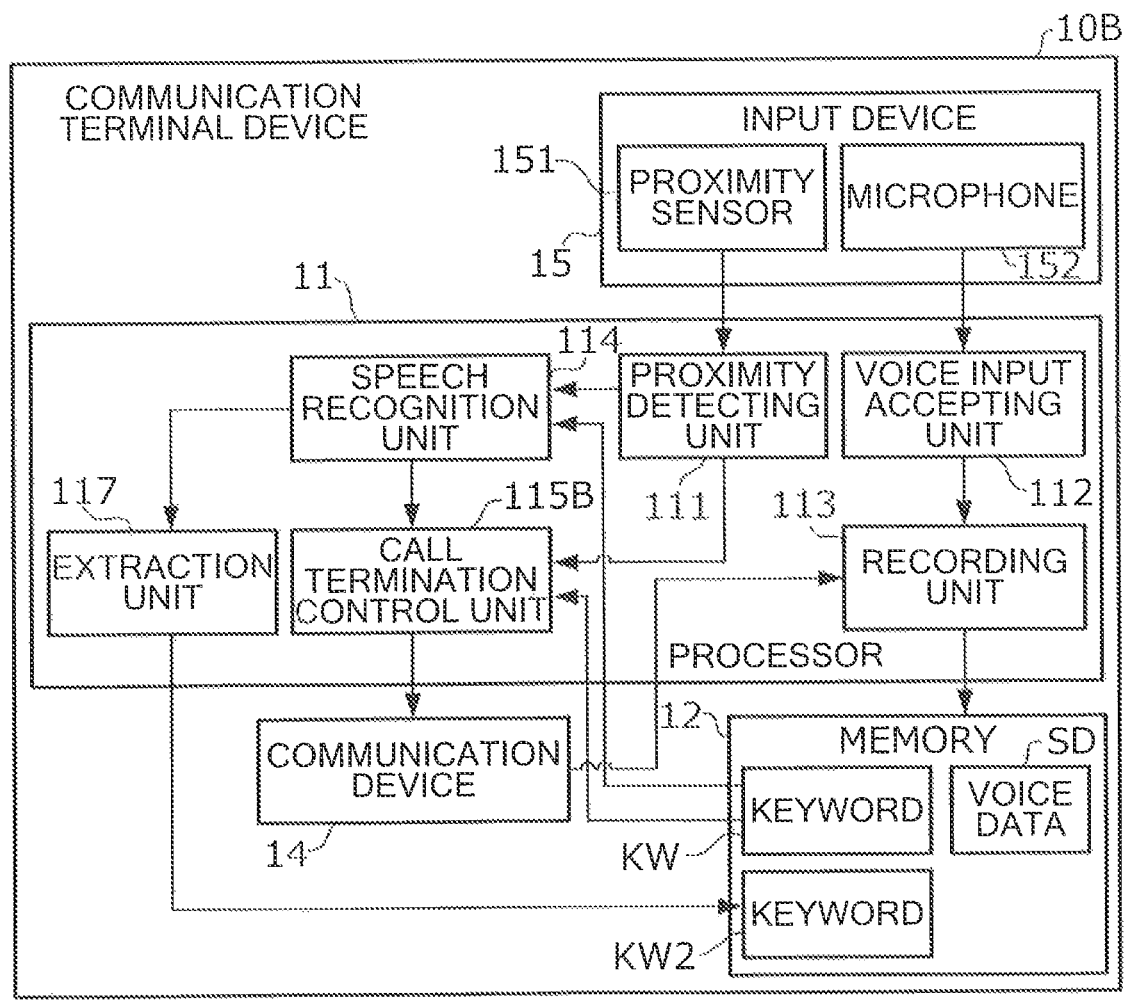
FIG. 10 is a diagram showing an example of a functional configuration of a processor of a communication terminal device according to modification 1 of the present invention.

FIG. 10 is a block diagram showing an example of a functional configuration of processor 11 of communication terminal device 10B according to the present modification. Processor 11 includes proximity detecting unit 111, voice input accepting unit 112, recording unit 113, speech recognition unit 114, call termination control unit 115B, and extraction unit 117.

Extracting unit 117 extracts a word that a user has uttered when terminating a call. For example, extraction unit 117 extracts a word that a user has uttered immediately before terminating a call. Extraction unit 117 registers a word extracted when terminating one or more calls, as keyword KW2. Call termination control unit 115B performs call termination control when keyword KW1 or KW2 is recognized.

Figure 11:
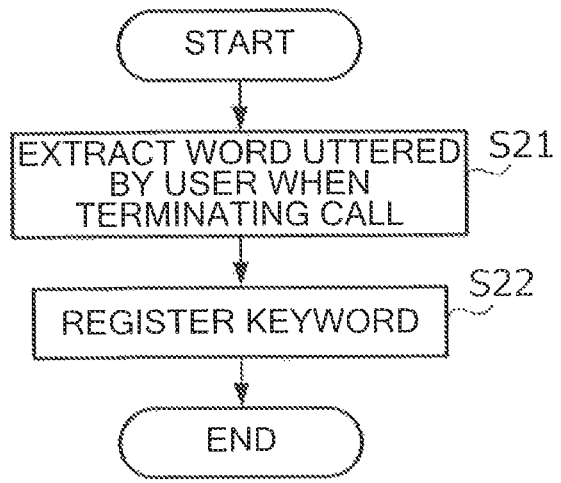
FIG. 11 is a flowchart showing a process executed during a call by the communication terminal device according to modification 1.

FIG. 11 is a flowchart showing a process executed during a call by communication terminal device 10B.

Extraction unit 117 extracts a word that a user has uttered when terminating a call (step S21). For example, extracting unit 117 extracts a word last recognized by speech recognition unit 114 for each call. Extraction unit 117 records an extracted word in memory 12. Subsequently, extraction unit 117 registers a word extracted when terminating a number of calls, the number being equal to or greater than a threshold value, in memory 12 as keyword KW2 (step S22). This is because a word that a user utters when terminating a call is likely to be used repeatedly.

In the present modification, registered keyword KW2 is a word extracted when terminating plural calls; however, a word extracted when terminating a single call may be registered as keyword KW2.

Call termination control unit 115B performs call termination control based on keyword KW2. Call termination control unit 115B may perform call termination control based on keyword KW1 before learning keyword KW2 is completed, and after keyword KW2 is registered, it may perform call termination control based on keywords KW1 and KW2 or on keyword KW2 only.

It is of note that the present modification may be applied to communication terminal device 10A according to the second embodiment.

According to the present embodiment, it is possible to enable a call to be terminated in response to a user's natural action taken to terminate the call, in a case where a word uttered by the user when terminating the call is a user-specific word.

Modification 2

Communication terminal device 10, 10A, or 10B is not limited to a smartphone, and may be a communication terminal device capable of performing communication to facilitate a call, such as a feature phone. Alternatively, a communication terminal device according to the present invention may be a communication terminal device capable of generating a bone conduction sound indicating a received voice in a user's body, namely, a communication terminal device including a speaker capable of outputting a bone conduction sound. The communication terminal device enables a user to talk when the device is in contact with a part of the user's head other than an ear.

A communication terminal device according to the present invention may not be a communication terminal device that is held in a user's hand during a call. A communication terminal device according to the present invention may a type of wearable terminal that can be mounted on a user's head, such as a headphone type or an earphone type.

Modification 3

The order of processes, sequences, and flowcharts of embodiments described in the present specification may be changed as long as no inconsistency is caused. Methods described in the present specification include steps arranged in an exemplary order, and the steps may be arranged in another order.

Modification 4

Input or output information may be stored in a location such as memory, or may be managed in a management table. Input or output information may be overwritten, updated, or additionally written. Output information may be deleted. Input information may be sent to another device.

Modification 5

A determination may be made based on a 1-bit value indicating "0" or "1," or a truth (Boolean) value indicating "true" or "false," or by comparing a value to a predetermined value.

Modification 6

Embodiments described in the present specification may be used separately or in combination with minor changes. A notification of information (for example, a notification of "being X") may be made explicitly or implicitly.

The present invention is described in detail in the foregoing; however, it is apparent to those skilled in the art that the present invention is not limited to the embodiments described in the present specification. The present invention may be implemented in modified or changed embodiments, without departing from the spirit and scope of the present invention defined by the description of the claims. The description in the present specification is for illustrative purposes and is not intended to limit the present invention in any way.

Software should be interpreted broadly to include instructions, instruction sets, codes, code segments, program codes, a program, a subprogram, software modules, an application, a software application, a software package, a routine, a subroutine, an object, an executable file, an execution thread, a procedure, and a function, regardless of whether it is called software, firmware, middleware, microcode, hardware description language, or any other name. Software and instructions may be sent and received via a transmission medium. For example, software may be sent from a website, a server, or another remote source, using a wired medium such as a coaxial cable, a fiber optic cable, a twisted pair, or a digital subscriber line (DSL), and/or a wireless medium such as infrared, wireless, or microwave. The wired medium and the wireless medium are included within the definition of a transmission medium.

Information and signals described in the present specification may be represented using any of various technologies. For example, data, instructions, commands, information, signals, bits, symbols, and chips that are described in the foregoing, may be represented by voltages, currents, electromagnetic waves, magnetic fields or particles, optical fields or photons, or any combination thereof.

It is of note that a term described in the present specification and/or a term necessary to understand the present specification may be replaced with a term having an identical or similar meaning.

The terms "system" and "network" used in the present specification are used interchangeably.

Information and parameters described in the present specification may be represented by an absolute value, a value relative to a predetermined value, or other corresponding information.

The term "determining" used in the present specification may refer to various actions. For example, the term "determining" may refer to judging, calculating, computing, processing, deriving, investigating, looking up (for example, looking up in a table, database, or data structure), and ascertaining. The term "determining" may also refer to receiving (for example, receiving information), transmitting (for example, transmitting information), inputting, outputting, and accessing (for example, accessing data in memory). The term "determining" may also refer to resolving, selecting, choosing, establishing, and comparing.

The description "based on" used in the present specification does not mean "based only on," unless explicitly stated otherwise. In other words, the description "based on" means both "based only on" and "based at least on."

The term "including" and variations thereof used in the present specification or the claims are intended to be inclusive, as in the case of the term "comprising." The term "or" used in the present specification or the claims is not intended to be an exclusive disjunction.

Modification 7

The block diagrams used to describe the above embodiments show blocks of functional units. The functional blocks may be provided using any combination of items of hardware and/or software. Means for providing the functional blocks are not limited. The functional blocks may be provided using a single device including physically and/or logically combined components, or two or more physically and/or logically separated devices that are directly and/or indirectly connected by wire and/or wirelessly.

Although the invention has been described with reference to particular embodiments thereof, it will be understood by one of ordinary skill in the art, upon a reading and understanding of the foregoing disclosure that numerous variations and alterations to the disclosed embodiments fall within the spirit and scope of this invention and of the appended claims. For example, those of ordinary skill in the art should recognize that one or more of the angles and dimensions of various structural features of the invention may be altered without deviating from the scope of the present invention.

DESCRIPTION OF REFERENCE NUMERALS 10, 10A, 10B communication terminal device
11 processor
111 proximity detecting unit
112 voice input accepting unit
113 recording unit
114, 114A speech recognition unit
115, 115A call termination control unit
116 measurement unit
117 extraction unit
12 memory
13 storage
14 communication device
15 input device
151 proximity sensor
152 microphone
16 output device
161 speaker
162 display area
17 bus

What is claimed is:

1. A communication terminal device for performing communication for a call, the communication terminal device comprising:
a processor configured to:
detect that a head of a user has approached the communication terminal device;
accept an input of a voice of the user;
record voice data in memory, the voice data indicating a voice of the user input during a duration of the call;
detect that a proximity of the head to the communication terminal device has ceased to be detected;
recognize a predetermined character string by the user from the voice call data stored in memory that was recorded during a defined period of time prior to and from the detection that the proximity of the head to the communication terminal device has ceased to be detected, wherein the defined period of time is less than the duration of the call; and
terminate the call upon detecting that the predetermined character string has been recognized, and that no proximity of the head to the communication terminal device is detected.

2. The communication terminal device according to claim 1, wherein the processor is further configured to:
measure an attitude of the communication terminal device;
terminate the call upon detecting that an attitude of the communication terminal device has changed after no proximity of the head to the communication terminal device is detected.

3. The communication terminal device according to claim 1, wherein the processor is further configured to:
extract a character string uttered by the user when terminating the call; and
use the character string extracted when terminating one or more calls, as the predetermined character string.

4. A method for performing communication for a call comprising:
detecting that a head of a user has approached a communication terminal device;
accepting an input of a voice of the user;
recording voice data in memory, the voice data indicating a voice of the user input during a duration of the call;
detecting that a proximity of the head to the communication terminal device has ceased to be detected;
recognizing a predetermined character string uttered by the user from the voice call data stored in memory that was recorded during a defined period of time prior to and from the detection that the proximity of the head to the communication terminal device has ceased to be detected, wherein the defined period of time is less than the duration of the call; and
terminating the call upon detecting that the predetermined character string has been recognized, and that no proximity of the head to the communication terminal device is detected.

5. The method according to claim 4, further comprising:
measuring an attitude of the communication terminal device; and
terminating the call upon detecting that an attitude of the communication terminal device has changed after no proximity of the head to the communication terminal device is detected.

6. The method according to claim 5, wherein measuring the attitude of the communication terminal device is provided by at least one of an acceleration sensor and an angular velocity sensor.

7. The method according to claim 4, further comprising:
extracting a character string uttered by the user when terminating the call; and
using the character string extracted when terminating one or more calls, as the predetermined character string.

8. The communication terminal device according to claim 2, wherein the processor is further configured to measure the attitude of the communication terminal device by use of at least one of an acceleration sensor and an angular velocity sensor.

9. A communication terminal device for performing communication for a call, the communication terminal device comprising:
a processor configured to:
detect that a head of a user is in a proximity of the communication terminal device;
accept an input of a voice of the user;
record voice data in memory, the voice data indicating the input of the voice of the user during a duration of the call;
detect that a proximity of the head to the communication terminal device has ceased to be detected;
recognize a predetermined character string uttered by the user from the voice data recorded in memory during a period of time, wherein the defined period of time is from a first point in time when the head ceases to be in the proximity of the communication terminal device to a predetermined second point in time prior to the first point in time, wherein the defined period of time is less than the duration of the call; and
terminate the call after recognizing the predetermined character string uttered by the user during the defined period of time, and that no proximity of the head to the communication terminal device is detected.

10. The communication terminal device according to claim 9, wherein the defined period of time is approximately 3 seconds to 10 seconds.

11. The communication terminal device according to claim 9, wherein the termination of the call further includes terminating the call after recognizing the predetermined character string uttered by the user during the defined period of time; detecting the head is not in the proximity of the communication terminal device after the predetermined character string is recognized; and detecting an attitude of the communication terminal device has changed after detecting the head is not in the proximity of the communication terminal device and recognizing the predetermined character string.

12. The communication terminal device according to claim 11, wherein the processor is further configured to detect the attitude of the communication terminal device by use of at least one of an acceleration sensor and an angular velocity sensor.

13. The communication terminal device according to claim 9, wherein the processor is further configured to:
extract a character string uttered by the user when terminating the call; and
use the character string extracted when terminating one or more calls, as the predetermined character string.

* * * * *